6 Sheets—Sheet 2.

F. NEWHOUSE & M. H. ALLEN.
MACHINE FOR MAKING PARQUETRY.

No. 189,872. Patented April 24, 1877.

Attest:
C. J. Fritz
Colborne Brookes

Inventors:
Fredrick Newhouse
Mortimer H. Allen.
by R. S. & A. P. Lacey
their attorneys

F. NEWHOUSE & M. H. ALLEN.
MACHINE FOR MAKING PARQUETRY.

No. 189,872. Patented April 24, 1877.

Attest:
C. J. Fritz
Colborne Brookes

Inventors,
Fredrick Newhouse
Mortimer H. Allen
by R. S. & A. P. Lacey
their Attorneys.

6 Sheets—Sheet 4.

F. NEWHOUSE & M. H. ALLEN.
MACHINE FOR MAKING PARQUETRY.

No. 189,872. Patented April 24, 1877.

Attest.
C. F. Trill
Colborne Brookes

Inventors:
Fredrick Newhouse
Mortimer H. Allen
by R. S. & A. P. Lacey
their attorneys 6 Sheets—Sheet 5.

F. NEWHOUSE & M. H. ALLEN.
MACHINE FOR MAKING PARQUETRY.

No. 189,872. Patented April 24, 1877.

Attest:
C. H. Fritz
Colborne Brookes

Inventors
Fredrick Newhouse,
Mortimer H. Allen,
by R.S. & A.P. Lacey,
their attorneys 6 Sheets—Sheet 6.

F. NEWHOUSE & M. H. ALLEN.
MACHINE FOR MAKING PARQUETRY.

No. 189,872. Patented April 24, 1877.

Attest.
J. Mason Goszler
W. Burris

Inventors.
Fredrick Newhouse
Mortimer H. Allen
by R. S. & A. Lacey
Attorneys

UNITED STATES PATENT OFFICE.

FREDRICK NEWHOUSE AND MERTIMER H. ALLEN, OF TOLEDO, OHIO.

IMPROVEMENT IN MACHINES FOR MAKING PARQUETRY.

Specification forming part of Letters Patent No. 189,872, dated April 24, 1877; application filed July 10, 1876.

*To all whom it may concern:*

Be it known that we, FREDRICK NEWHOUSE and MERTIMER H. ALLEN, of Toledo, in the county of Lucas and State of Ohio, have invented certain new and useful Improvements in Inlaying-Machines; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Our invention relates to improvements in machinery for the production of parquetry and other ornamental wood-work, particularly such as that described in the specification of Letters Patent granted to us, dated March, 17, 1874, and numbered 148,739, the nature of which will be fully understood by reference to the accompanying drawings, in which—

Figure 1:
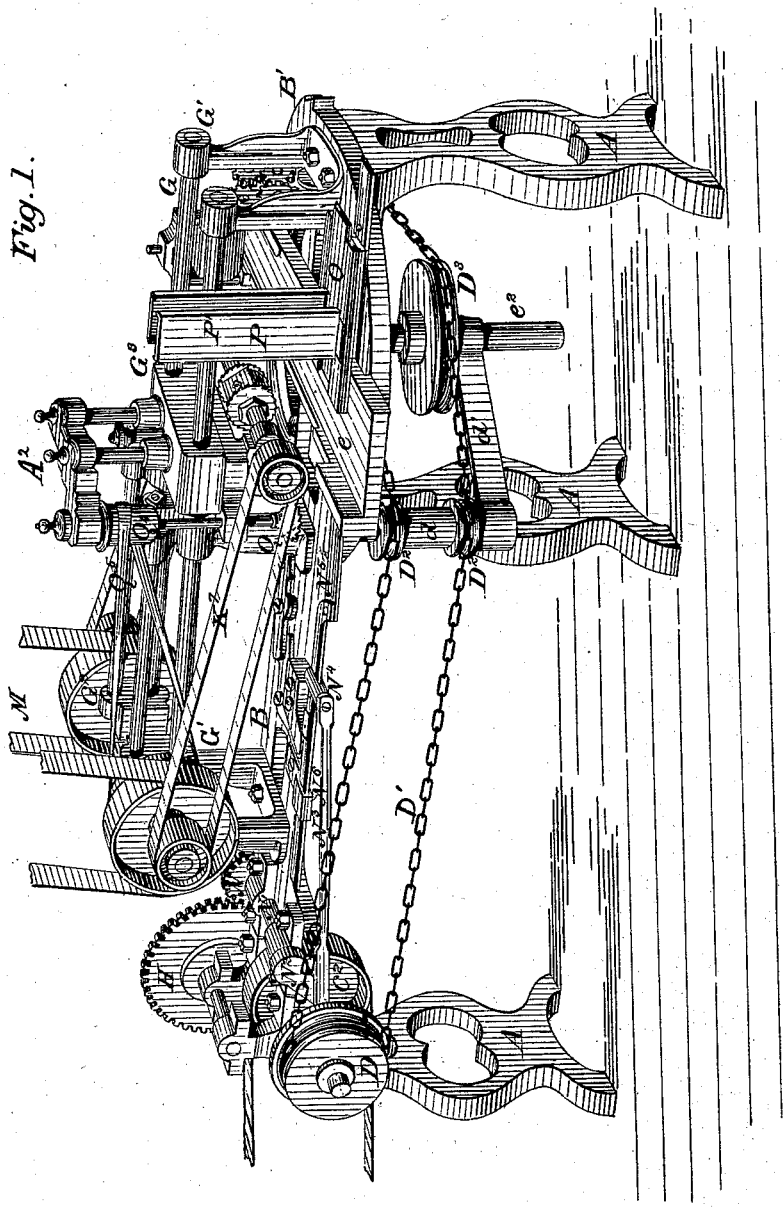
Figure 2:
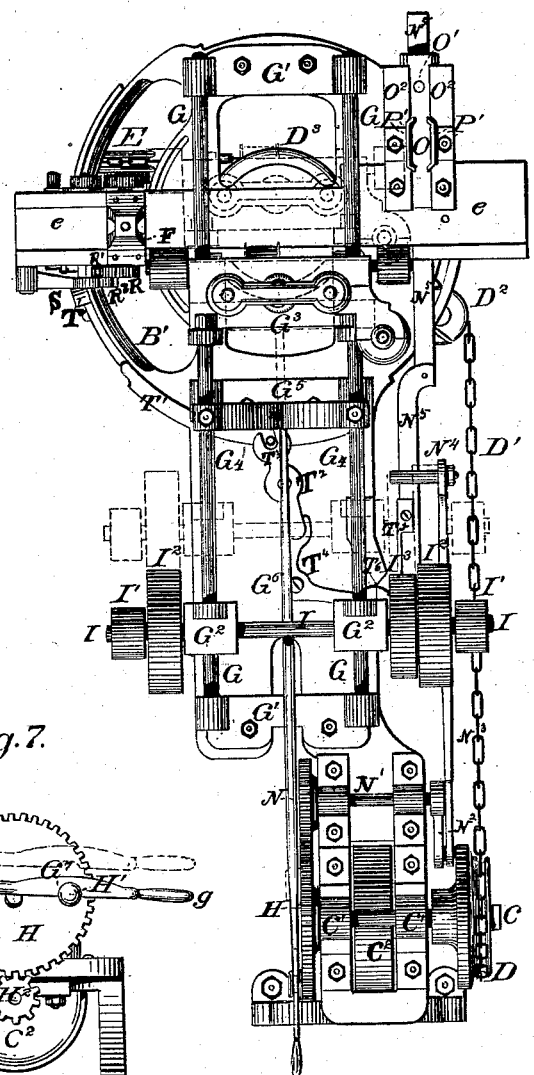
Figure 7:
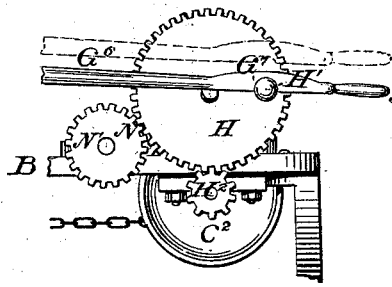
Figure 9:
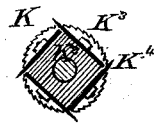
Figure 3:
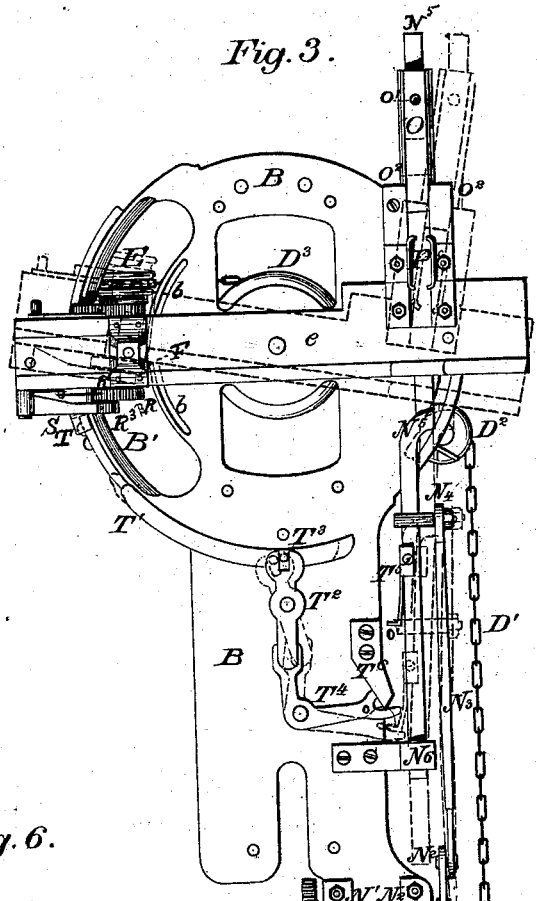
Figure 6:
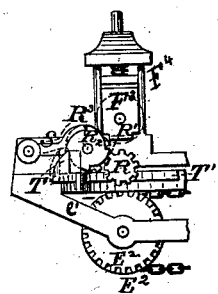
Figure 8:
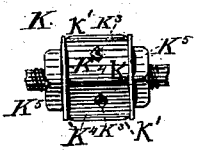
Figure 4:
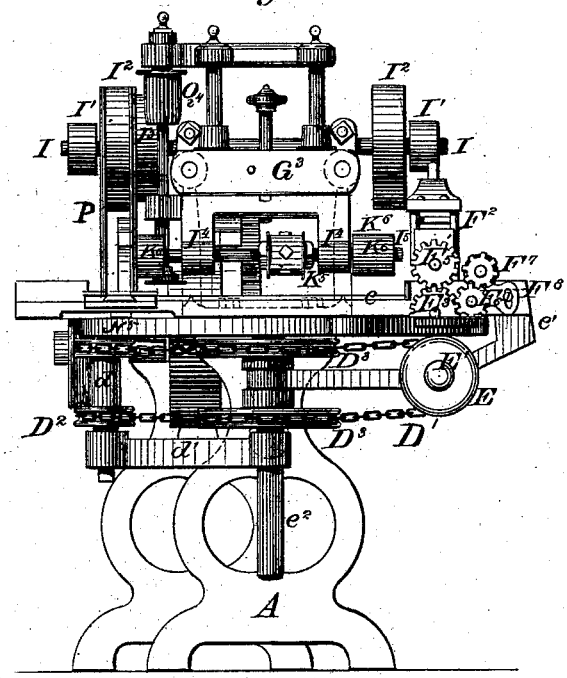
Figure 5:
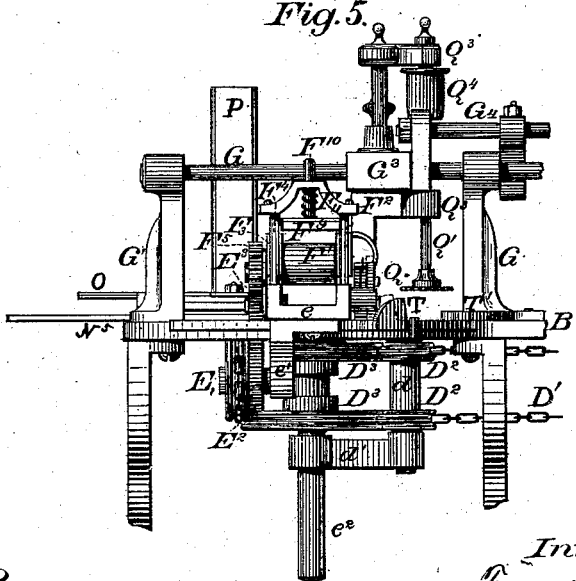
Figure 10:
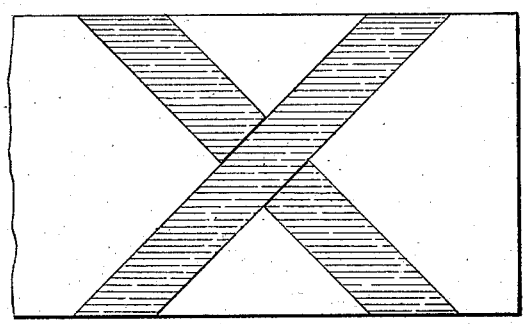
Figure 11:
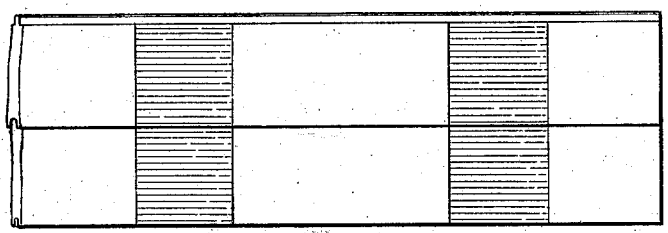
Figure 12:
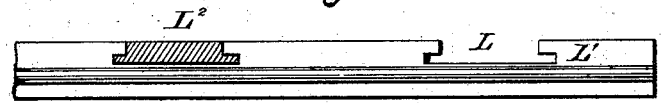
Figure 13:
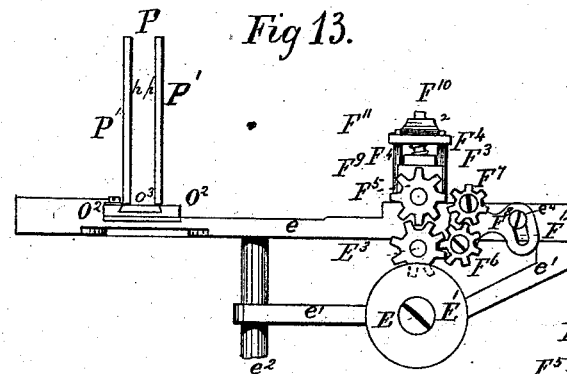
Figure 14:
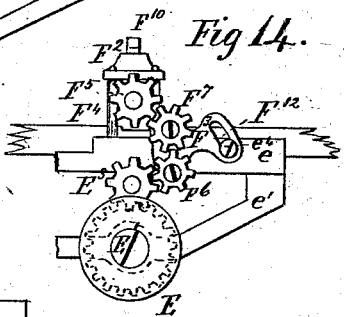
Figure 15:
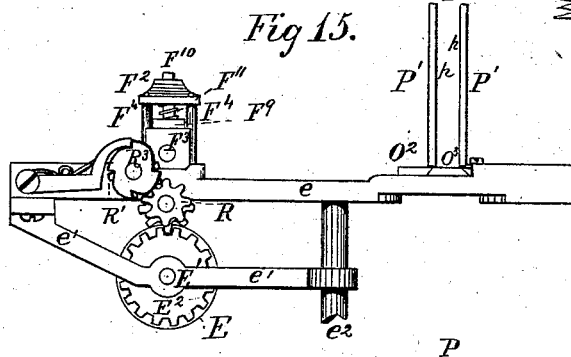
Figure 16:
Figure 17:
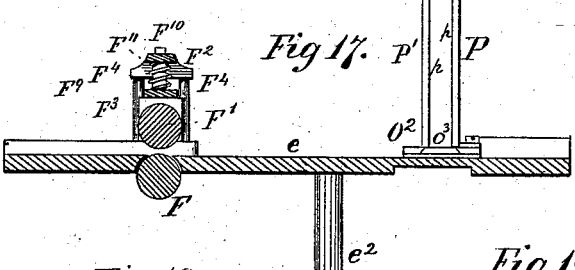
Figure 18:
Figure 19:
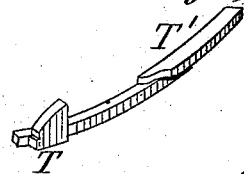

Figure 1 is a perspective view; Fig. 2, a plan view; Fig. 3, a plan view with parts removed; Fig. 4, a front view; Fig. 5, a partial side view of the apparatus constructed according to our invention. Figs. 6, 7, 8, and 9 show parts separately. Fig. 10 shows a plan of a portion of wood-work inlaid according to our invention. Fig. 11 shows a portion of two planks or boards similarly ornamented, and Fig. 12 is a sectional view of the same, and Figs. 13, 14, 15, 16, 17, 18, and 19 are detail views.

In each of the views similar letters of reference are employed to indicate corresponding parts wherever they occur.

A is the main frame, on which is secured the bed-plate B, which supports, on suitable brackets or arms and guide-rods, a sliding frame or carrier, $A^2$, hereinafter more fully described.

C is the driving-shaft, which is mounted in bearings $C^1$, and provided with a driving-pulley, $C^2$, arranged to work in a slot or opening formed in the bed-plate B. Upon the driving-shaft C is also mounted a pulley-wheel, D, around which passes an endless chain, $D^1$, which is, by means of guide-pulleys $D^2 D^3$, conducted to the farther end of the machine, and around a pulley-wheel, E, the axis of which is journaled in bearings on the arm $e^1$. The pulley-wheel E is attached to a gear-wheel, $E^2$, which engages with and drives a gear-wheel, $E^3$, mounted on the axis of one of a pair of feed-rollers, F $F^1$.

The axis of the under feed-roller F is journaled in bearings in or affixed to the guide-plate $e$, hereinafter described, and is so arranged that its upper surface will press against the under side of the board which may be passed through said guide-plate. The axis of the upper feed-roller $F^1$ is journaled in bearings $F^3$, which are held, with capability of a sliding vertical movement, between the vertical standards or guides $F^4$, which have their lower ends secured in the guide-plate $e$, and have their upper ends secured in the crown-plate $F^2$.

The upper feed-roller $F^1$ has secured to its axis the gear-wheel $F^5$, which engages directly with the gear-wheel $E^3$, or indirectly by means of the intermediate gear-wheels $F^6 F^7$. The intermediate wheels $F^6 F^7$ are constantly in gear the one with the other. They are mounted on axes on the adjusting-arm $F^8$, which is provided with the inclined curved slot $F^{12}$, which slides upon the pin or stud $e^4$ on the side of the guide-plate $e$. The wheel $F^6$ remains constantly in gear with the wheel $E^3$, while the pinion $F^7$ is retained constantly in gear with the wheel $F^5$, by means of the movement of the arm $F^8$ segmentally on the axis of the wheel $F^6$, and on the guide pin or stud $e^4$.

The object of thus arranging the gear-wheel $F^7$ is to allow of the adjustment of the rollers F $F^1$ to boards of different thicknesses.

$F^9$ is a sliding plate, arranged above the bearing of the roller $F^1$. In the center of this plate is arranged a pin or stud, $F^{10}$, passing through the crown-plate $F^2$, in order to insure the proper working of the bearing $F^3$. $F^{11}$ is a spiral spring, for the purpose of pressing the roller $F^1$ down upon the board or strip to be fed into the machine.

$e$ is the guide-plate, through which the board or plank is pressed in the operation of the machine. It is provided with suitable side flanges, and has affixed centrally to its under side, and has its axis in and turns upon the shaft $e^2$, which passes downward through the bed-plate B. It may be turned on its axis, and set at any desired angle to the line of movement of the cutter-head, hereinafter described.

The arm $e^1$, supporting the axis of the pulley-wheel E, is connected at one end to the under side of the guide-plate $e$, while its opposite end is supported by the shaft $e^2$. Upon the shaft $e^2$ are also mounted the guide-pulleys $D^3 D^3$, while the pulleys $D^2 D^2$ are supported and carried by a vertical shaft, $d$, affixed to an arm, $d^1$, also carried by the shaft $e^2$.

$A^2$ is a carrier or frame mounted on sliding bearings $G^2 G^3$, connected together horizontally by means of rods $G^4$, so as to insure simultaneous action on the parallel guide-rods G G, which are supported by the brackets or arms $G^1$ on the bed-plate B. A to-and-fro motion is imparted to the carrier $A^2$ by means of a cross-bar or connecting-piece, $G^5$, which is formed with a bearing capable of receiving the end of the connecting-rod $G^6$, one end of which is pivoted thereto, the other end of said rod being provided with a semicircular bearing, $G^7$, capable of being received upon a pin or stud, $H^1$, standing out from the face of the cog-wheel H, which receives motion from the cog-wheel $H^2$, mounted on the driving-shaft C.

The carrier $A^2$ is adapted to receive and support a cross-shaft, I, upon which are mounted a series of pulleys, $I^1 I^1$, $I^2 I^2$, and $I^3$, adapted to communicate motion to parts of the apparatus, as hereinafter more fully described. Upon the under side of bearing $G^3$, by means of the lugs $I^4 I^4$, is supported a cross-shaft, $I^5$, supporting and driving a cutter, K, adapted to form the channel L, (Shown in Fig. 12.) The cutter K is composed of a series of horizontal blades, $K^1 K^1$, mounted on a block or bearing-piece, $K^2$, to which they are secured by suitable screws or bolts $K^3$. On the sides of the cutter K are mounted a pair of circular saws, $K^4 K^4$, which form a part of said cutter, and which are arranged to cut slightly in advance of the blades $K^1$, and vertically into the wood, so as to form the sides of the channel L, and prevent the slivering of the surface of the board by the action of the blades in removing the wood from the channel. The cutter K is capable of adjustment horizontally on a shaft by means of the nuts $K^5$.

Motion is communicated to the shaft $I^5$, and consequently to the cutter K, by means of the pulleys $K^6 K^6$, which receive motion by means of the bands $K^7 K^7$ passing over the pulleys $I^1 I^1$ on the shaft I, the latter receiving its motion by means of a strap or band, M, which travels backward and forward with this part of the apparatus, and is driven by a pulley and shaft above the machine.

N is a pinion, which gears into the cog-wheel H, and communicates motion to the crank $N^2$ on the end of the axle or shaft $N^1$. To the crank $N^2$ is pivoted one end of a connecting-rod, $N^3$, the opposite end of which is pivoted to a stud or bracket, $N^4$, on the sliding bar $N^5$, which is supported at its rear end in the guide $N^6$, carried by the plate B, while at its opposite end it rests on the plate B, and is provided with a stud, $O^1$, working freely in bearings formed in the sliding feed-plate O, which in the operating of the machine slides back and forth in the channel of the feed-box P.

P is the feed-box. It is composed of the base-plate $O^2$, in which is formed the feed channel or groove $O^3$, in which slides the feed-plate O, and of the vertical plates $P^1 P^1$, provided with flanges $p$ $p$, which retain and guide the blocks to the feed-channel $O^3$. It is secured by suitable means to, and is carried by, the guide-plate $e$. Feed-boxes are employed of different sizes and construction, conforming to the size of the blocks, and to the different angles at which the channels L are cut.

Q is a circular saw or router mounted on the lower end of a shaft or spindle, $Q^1$, supported in a vertical position by means of the bearings $Q^3 Q^3$ affixed to the carrier $A^2$. Revolving motion is communicated to the router Q by means of the pulley $Q^4$, band $Q^5$, and pulley $I^3$ on shaft I.

$R^3$ is an index-wheel, which has secured to its axis the pinion-wheel $R^1$, which engages with the pinion R on the axis of the under feed-roller F. Its periphery is formed with a series of shoulders, $r$, arranged so as to indicate the distances between the channels L L' cut in the plank, as the latter passes through the guide-plate $e$, and between the feed-rollers F $F^1$. S is a spring stop or pawl, having one end pivoted to the side of the guide-plate $e$, while its other end is constructed and arranged so as to engage with the shoulders $r$ on the index-wheel $R^3$, and prevent the revolution of the rollers F $F^1$, except at the moment it is desired to feed the board forward into the machine, in order to cut a fresh channel, as hereinafter described. The stop S is released from its hold on the index-wheel $R^3$ at the desired moment by a cam, T, attached to and operated by a circular sliding bar, $T^1$, supported by and working around the circular head $B^1$ of the bed-plate B. The sliding bar $T^1$ is operated to and fro by means of a pivoted lever, $T^2$, one end of which is slotted so as to receive a pin, $T^3$, formed on or affixed to the bar $T^1$, while its opposite end is furnished with a pin capable of being received into one of the forked ends of an L-shaped lever, $T^4$, the opposite forked end of which is operated by means of a spring-arm, $T^5$, carried by the sliding bar $N^5$. The spring-arm $T^5$ is guided into and out of position to operate L-shaped lever $T^4$ by means of the cam $T^6$ affixed on the bed-plate B, as shown more particularly in Fig. 2.

The cutter K and router Q are transferable, and may be replaced by others of different widths or diameters, so as to regulate the width and depth of the channels L L¹. The distance between the channels L L¹ may also be adjusted by changing the diameter or number of teeth in the index-wheel R³, or by otherwise regulating the revolution of the feed-rollers F F¹. The router Q is arranged at one side of the cutter K and the rear thereof in such position that it may freely pass through the previous channel when traveling one way, and through the next succeeding channel, when it returns in the opposite direction.

By forming parquetry or ornamental woodwork by this machine, the strips, when brought together will match correctly.

The operation of the machine is as follows: The board or strip to be operated upon is fed to the machine intermittently by means of the rollers F F¹.

On starting the machine the end of the board is fed into such position that on the forward motion of carrier A² the cutter K will pass over the board and form a channel L, at the desired place. After this channel has been formed and the cutter K has cleared the board the latter is automatically advanced the desired distance so as to bring the channel L opposite the router Q, when the carrier A² returns and the cutter K forms another channel, and the router Q at the same time passes through the first or previously-formed channel, L, cutting the side channels L¹, and thus completing the channel L for the reception of the block L². The cutter and router having on the return movement cleared the board, the latter is again automatically advanced, the carrier is moved forward, and a new channel is formed and completed, as in the return movement of the carrier above described.

The feed-box P is filled with prepared pieces or blocks L² for filling the channels L L¹. When the carrier A¹ has been operated either forward or backward so as to complete channels L L¹, as above described, the automatic advancement of the board will also bring the completed channel opposite the groove or feed-channel O³ in the feed-box, and in the continued operation of the machine a block is forced from the feed-box into said completed channel by the sliding feed-plate O, which is operated by means of the crank N², connecting-rod N³, and sliding bar N⁵. Thus it will appear that with each forward or backward movement of the carrier A² a channel, L, and a channel, L¹, are formed, and a previously-completed channel is filled by a block, L². When it is desired to form the channels L L¹ at right angles to the edges of the strip or board, as shown by Fig. 11, the guide-plate e is arranged in such position as to bring the board to cut in a line parallel with the axis of the cutter K; but when it is desired to change the direction of the cut—for instance, as shown by Fig. 10—the guide-plate e is turned on its axis, as shown by dotted lines in Fig. 3, so that the cutter K and router Q shall form channels L L¹ diagonally across the board or strip. The guide-plate e is held at any desired angle to the cutters by means of screws or bolts passing through slots or opening b in the circular head B¹.

It will be readily seen that while the cutter K and router Q are traversing to and fro the cam T will be drawn back so as to cause the stop S to prevent the revolution of the feed-rollers F F¹, which, being held stationary, will retain the board or strip being operated upon steady while channels L L¹ are being cut; but as soon as the cutter and router have passed clear of the board the cam T is forced under and raises the stop S from contact with the index-wheel R³, thereby permitting the rollers to revolve and advance the board a proper distance for the formation of another channel. When the board is advanced the proper distance the cam T is withdrawn from beneath the stop S, and the latter engages with the index-wheel R³, and stops the revolution of the feed-rollers.

The connecting-rod G⁶ is provided with a handle, g, for the purpose of facilitating its removal from contact with its pin H¹ in the event of its being necessary to stop the to-and-fro movement of the carrier A² for any purpose without necessitating the stoppage of the other machinery. This is of particular advantage in the event of accident to the cutter K or router Q.

Having described our invention, what we claim, and desire to secure by Letters Patent, is—

1. The combination, with the cutter-head K and bed-plate B, of the guide-plate e, capable of adjustment so as to regulate the angle of the channels for the reception of the ornamental strips or blocks, substantially as described.

2. A carrier, A², constructed with a revolving cutter, K, and router Q, arranged one in front and at the side of the other, substantially as and for the purpose described.

3. The feed-box P, formed of the base-plate O², provided with the channel O³, and of the vertical plate P¹ P¹, having the flanges p p, substantially as and for the purpose stated.

4. The combination, with a feed-box, P, and the operating mechanism of a parquetry machine of a slide, O, so arranged as to feed a block into a previously-formed channel, substantially as described.

5. The combination, with the pivoted guide-plate e and feed-rollers F F¹, of the pinions R R¹, index-wheel R³, and stop S, substantially as set forth.

6. The combination, with the feed-rollers F F¹ and index-wheel R³, and stop S, of a cam, T, sliding bar T¹, levers T² T⁴, spring-arm T⁵, cam T⁶, and sliding bar N⁵, substantially as described.

7. The combination, with the bed-plate B, pivoted guide-plate $e$, and feed-rollers F F$^1$, of the shaft $e^2$, pulleys D$^3$ D$^3$, arm $d^1$, pulleys D$^2$ D$^2$, chain D$^1$, and friction-pulley D E, substantially as set forth.

8. The combination, with the guide-plate $e$ and feed-rollers F F$^1$, pinions E$^3$ F$^5$, and intermediate wheel F$^6$, of the intermediate wheel F$^7$, and pivoted arm F$^8$, substantially as and for the purpose set forth.

In testimony that we claim the foregoing as our own we affix our signatures in presence of two witnesses.

FREDRICK NEWHOUSE.
MERTIMER H. ALLEN.

Witnesses:
H. A. CHAMBERLIN,
J. W. CHAMBERLIN.